(12) United States Patent
Sawall et al.

(10) Patent No.: US 7,475,490 B2
(45) Date of Patent: Jan. 13, 2009

(54) HAND HELD YARN MEASURING DEVICE

(75) Inventors: Rolf-Reiner Sawall, Lossburg (DE); Lina Sawall, legal representative, Lossburg (DE); Karl-Heinz Sawall, legal representative, Betzweiler-Wälde (DE); Gerhard Sawall, legal representative, Lossburg (DE); Wolfgang Sawall, legal representative, Lossburg (DE); Sabine Krauter, legal representative, Lossburg (DE); Rita Haug, legal representative, Lossburg (DE); Christoph Wörner, Baiersbronn (DE); Karl-Heinz Mühlberg, Dornstetten (DE)

(73) Assignee: Memminger-IRO GmbH, Dornstetten (DE)

( * ) Notice: Subject to any disclaimer, the term of this patent is extended or adjusted under 35 U.S.C. 154(b) by 341 days.

(21) Appl. No.: 10/538,430

(22) PCT Filed: Nov. 28, 2003

(86) PCT No.: PCT/EP03/13418

§ 371 (c)(1),
(2), (4) Date: Mar. 6, 2006

(87) PCT Pub. No.: WO2004/052765

PCT Pub. Date: Jun. 24, 2004

(65) Prior Publication Data

US 2008/0022544 A1    Jan. 31, 2008

(30) Foreign Application Priority Data

Dec. 12, 2002 (DE) .............................. 102 57 997

(51) Int. Cl.
*G01L 5/04* (2006.01)
*G01P 3/50* (2006.01)

(52) U.S. Cl. ............................... 33/735; 33/734; 33/736
(58) Field of Classification Search ............... 33/732, 33/734–736
See application file for complete search history.

(56) References Cited

U.S. PATENT DOCUMENTS

| 2,472,142 | A |   | 6/1949  | Boulin              |
|-----------|---|---|---------|---------------------|
| 2,564,150 | A |   | 8/1951  | Brown               |
| 3,962,730 | A | * | 6/1976  | Robinson ..... 33/740 |
| 3,992,936 | A |   | 11/1976 | Clemens et al.      |
| 4,092,857 | A | * | 6/1978  | Lawson .......... 73/862.46 |
| 4,245,512 | A | * | 1/1981  | Saunders ....... 73/789 |
| 5,725,174 | A | * | 3/1998  | Kothmeier ..... 242/413.5 |

FOREIGN PATENT DOCUMENTS

DE      101 01 747 A    7/2001

\* cited by examiner

*Primary Examiner*—Yaritza Guadalupe-McCall
(74) *Attorney, Agent, or Firm*—Leydig, Voit & Mayer, Ltd.

(57) ABSTRACT

A handheld yarn measuring device (1) for monitoring yarn in yarn processing machines. The yarn measuring device includes a catcher (8), which when a trip lever (6) is actuated, places the yarn over a yarn applicator element (27) of a force sensor (29). The yarn tension and speed is detectable and delivered to a processing device for display and further processing. The device, which may be operated by one hand, has a boomerang-shaped housing (2) one end of which supports the trip lever (6), a control knob (10) and a display (5). The control knob (10) can be twisted and depressed by the user's thumb so that the selection of all the measurement and operating modes can be done with only the thumb. The measurement is performed by means of the trip lever (6), which actuates both the yarn catcher (8) and a measurement activation switch (49).

20 Claims, 7 Drawing Sheets

HAND HELD YARN MEASURING DEVICE

FIELD OF THE INVENTION

The present invention relates to yarn measuring devices for use with yarn processing machines, and more particularly, to a hand-operated yarn measuring device.

BACKGROUND OF THE INVENTION

Machines that use yarn often draw many individual yarns from so-called creels, and the yarns then travel to the machine. In practice, there is sometimes a need to be able to determine the yarn quantity and/or yarn speed of the yarns traveling to the machine. For that purpose, a yarn measuring device is known, such as disclosed in German Published Patent. Application DE-OS 2557593, which is a hand-operated measuring instrument suitable for freehand measurements. This yarn measuring device has a pistol-shaped two-legged housing, one leg of which forms a handle and the other leg of which has a yarn catcher on its free end. The yarn catcher is formed by a pivotably supported lever, which has a peg with a thickened head on its free end that serves as a yarn guide element. A drum that is connected to a rotary speed measuring device is rotatably supported concentrically with the axis of rotation of the pivot lever. The pivot lever is connected, via a rack drive mechanism, to an actuating lever that is accessible on the front of the housing part that forms the handle. It can be moved onto the handle, counter to the force of a pre-stressing spring, causing the pivot lever to execute a pivoting motion of approximately 180°. If a yarn was previously engaged from behind with its yarn guide element, then the yarn is as a result placed on the rotatably supported drum, which is thus set into rotation by the yarn motion. The rotary speed of the drum is a measure for the yarn speed.

Measuring the yarn speed in the foregoing manner is adequate for some applications. However, the need exists for a more-versatile yarn measuring device.

OBJECTS AND SUMMARY OF THE INVENTION

It is an object of the present invention to provide a more versatile hand held yarn measuring device that this adapted for measuring and/or monitoring a number of operating parameters of moving yarn in a yarn processing machine or the like.

The yarn measuring device of the invention is particularly suited for freehand measurements. It has a housing with a handle and an actuating device is provided on the handle. The yarn measuring device also has a yarn catcher, which is supported for adjustable positioning between a tuck position and a measuring position. It can be moved back and forth between its tuck position and its measuring position, via an actuating mechanism, and by means of the actuating device. A yarn guide element also is provided, by way of which the yarn catcher, when it is in the measuring position, guides the yarn. Between the yarn guide element and the yarn catcher when the measuring position, a yarn tension meter is provided, which serves to detect the yarn tension and furnishes an electrical signal accordingly. This creates one basic operating feature for more-versatile use of the yarn measuring device. Not only can the yarn speed or yarn quantity be measured, but also the yarn tension, which substantially broadens the range of application of the hand-operated measuring instrument. With the arrangement of the invention, a further feature involves measuring the yarn tension virtually independently of the skill of the user. The angle at which the yarn measuring device is held relative to the yarn does not matter, nor is any manual skill necessary. The yarn travels to both sides of the yarn tension meter via one yarn guide element on each side so that the angle at which the yarn brushes over the yarn tension meter is correctly defined without any action on the part of the user. Incorrect measurements can thus be avoided. The yarn also is hardly capable of jumping off the yarn measuring device during measurement, even if the yarn measuring device is not being held entirely parallel to the yarn.

The yarn guide element carried by the yarn catcher preferably is a yarn spool that is rotatably supported with little friction and is set into rotation by the yarn. This makes accurate yarn tension measurements possible.

The measuring position of the yarn catcher is preferably defined by a stop means so that the position is maintained precisely, regardless of the user's skill or any tolerances in the actuating mechanism. The stop means is, for instance, a stop face, peg, protrusion, or the like, that defines the path of motion of the yarn catcher.

The yarn catcher preferably is a pivotably supported lever. Alternatively, however, displaceable, linearly movable elements or the like can be used. However, utilizing a pivot lever as the yarn catcher has the advantage that a yarn can be taken up and shifted to the measuring position easily.

The yarn guide element can be connected not only with a yarn tension meter and indicator, but also with a sensor device, such as a rotary position sensor or an rpm sensor. As a result, the yarn speed, yarn quantity, and the like all can be measured.

The yarn tension indicator meter preferably has a yarn applicator element, embodied as a pin, for instance a ceramic pin, which extends substantially parallel to the axis of rotation of the lever and transversely to the yarn traveling through. The pin can be supported directly by a force sensor. No perceptible motion of the pin occurs under the influence of the force originating at the deflected yarn, and as a result the yarn tension meter responds quickly and precisely.

The yarn tension meter is preferably connected to a processing device disposed in the hand-operated measuring instrument inside the housing. The processing device is connected to a display device, which together with a control knob, serves to control the yarn measuring device. The control knob, which preferably is adopted for one-handed operation, may be in the form of a knob or pushbutton. The setup of various measurement specifications can be done by way of a menu guide specified by the processing device. The selection of menu items can be made by rotating the control knob, and the selection of menu items can be done by depressing the control knob.

The processing device provides enhanced functionality. For instance, yarn tension can be measured in various units, such as average yarn tension, peak yarn tension, and so forth. The deviation from a normal tension also can be displayed. It is furthermore possible to display the yarn length in various units, such as meters, inches, and yards. It is also possible to display the yarn speed in different units both as an average value and a peak value and to display fluctuations in the yarn speed.

In an advantageous embodiment, the processing device, furthermore, is connected to an interface which can receive signals from an external source. The interface can be embodied as a plug connector device for cables, or it can be cordless. For instance, signals can be received here that characterize the rotary speed of the machine. The processing device can thus determine weighted variables, such as yarn length per machine revolution, and display them.

For the power supply to the processing device, the hand-operated measuring instrument has one or more batteries or accumulators. These are preferably contained in the housing, such as in a battery compartment with closure lid that also serves as an actuating member or device. The actuating mechanism can serve as a locking device, which unlocks the closure lid when the lid is pressed onto the housing or into an actuating position. Unlocking of the closure lid is no problem then, because it is held by the user's hand. However, as soon as it is released, it snaps back into its initial position, in which it is once again locked by the actuating mechanism. If it needs to be removed, this can be done by holding the yarn catcher in its measuring position while the actuating device is released.

Other objects and advantages of the invention will become apparent upon reading the following detailed description and upon reference to the drawings, in which:

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF PREFERRED EMBODIMENT

Referring now more particularly to the drawings, there is shown an illustrative yarn measuring device 1 in accordance with the invention, which as will be understood by one skilled in the art, is adaptable for use with yarn being processed through a yarn knitting or other processing machine. The yarn measure device 1 in this case has an elongated housing formed by two housing portions 3, 4 bent an at obtuse angle with respect to each other. The longer housing portion 4 serves as a handle. On its back side, which faces the user during use, there are a display 5 and a control knob 10. On its front side, which faces away from the user, there is a displaceably or pivotably supported trip lever 6. This lever can be a housing portion or housing part in the form of a shell and, or as will become apparent hereinafter, can at the same time serve as a battery compartment lid.

Figures 1, 4, 5:
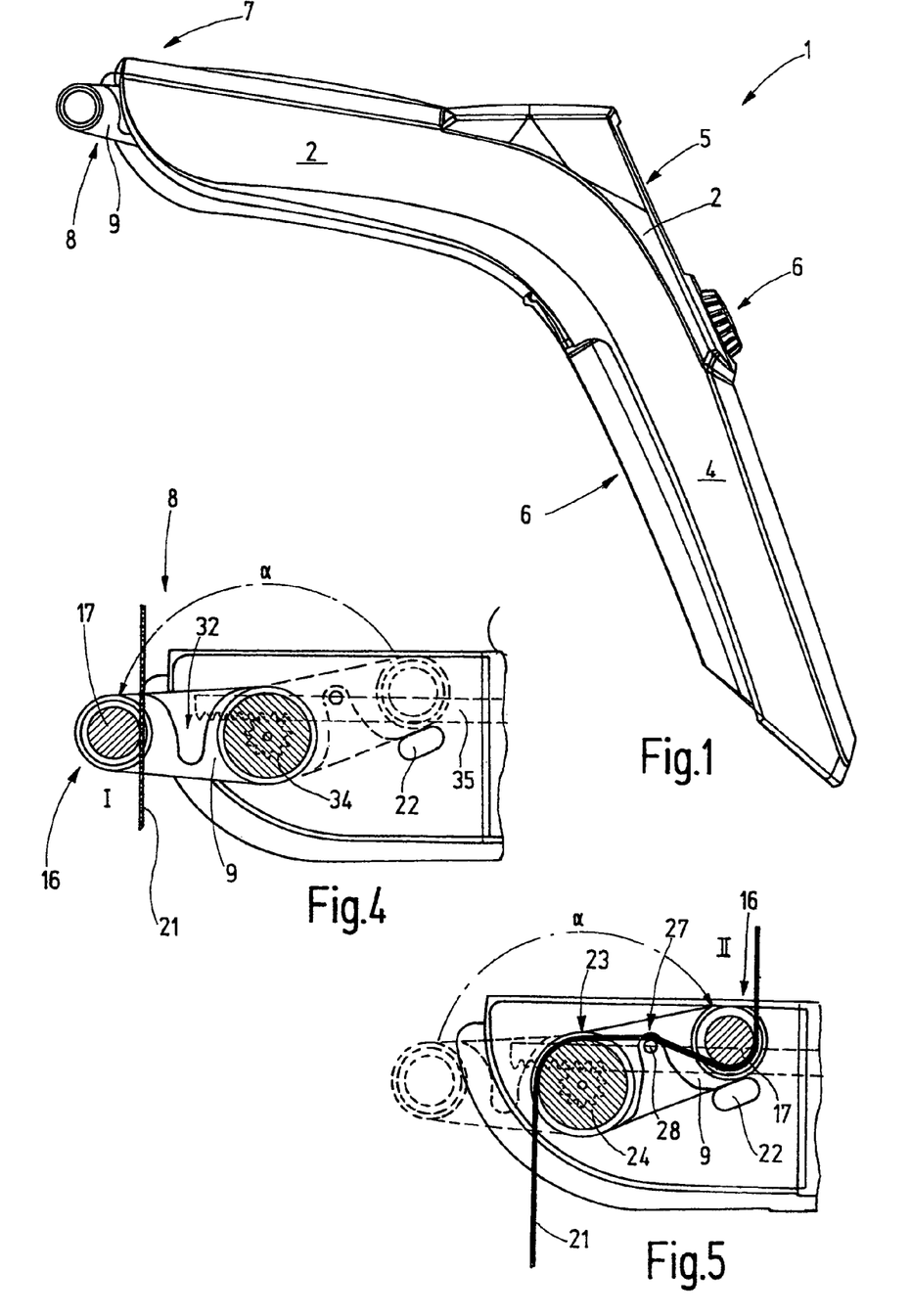
FIG. 1 is a side elevational view of a yarn measuring device in accordance with the invention.
FIG. 4 is a fragmentary section of the illustrated yarn measuring device showing a yarn catcher thereof in a first or tuck position.
FIG. 5 is a fragmentary section, similar to FIG. 4, showing the yarn catcher in a second or measuring position.
Figures 2, 3:
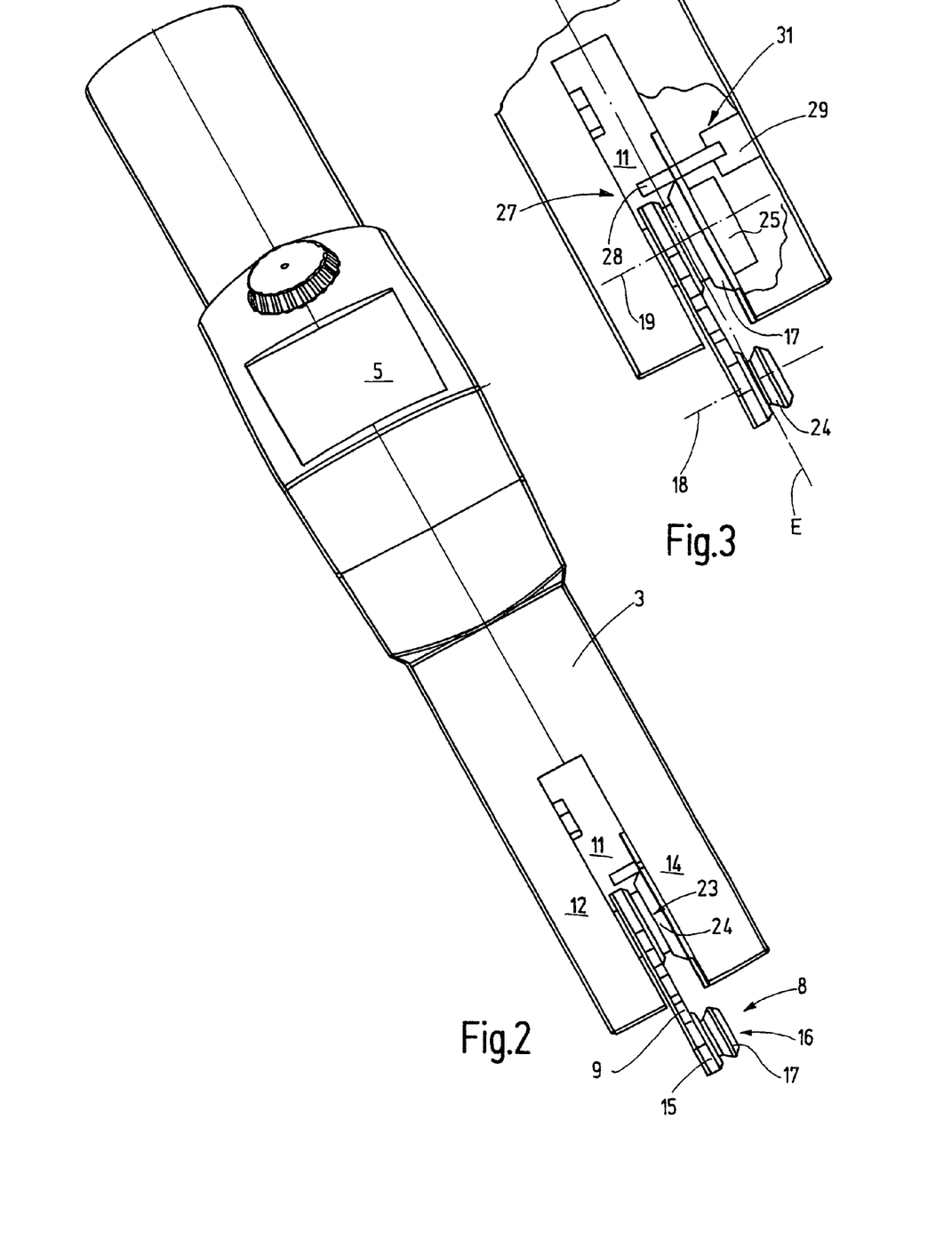
FIG. 2 is an enlarged plan view of the yarn measuring device shown in FIG. 1.
FIG. 3 is an enlarged fragmentary view of the yarn guide end of the illustrated yarn measuring device.

On its front free end 7, the yarn measuring device 1 has a yarn catcher 8, which includes a pivotably supported lever 9. The lever 9, as depicted in FIG. 2, is disposed between two forklike legs 12, 14 of the housing portion 3, which define a passage 11. On its free end 15, the lever 9 has a yarn guide element 16, in the form of a rotatably supported yarn spool 17 whose axis of rotation 18 is oriented parallel to the pivot axis 19 of the lever 9 (FIG. 3). The yarn catcher 8 formed by the lever 9 is pivotable between two positions I, II, which are shown in FIGS. 4 and 5, respectively. The pivoting angle a is preferably somewhat less than 180°. Position I depicted in FIG. 4 is a tuck position in which an imaginary connecting line between the axis of rotation 18 and the pivot axis 19 (FIG. 3) is at approximately right angles to a yarn 21 that is to be sensed. The other position II (FIG. 5) is the measuring position in which the lever 9 rests on a stop peg 22.

Figure 6:
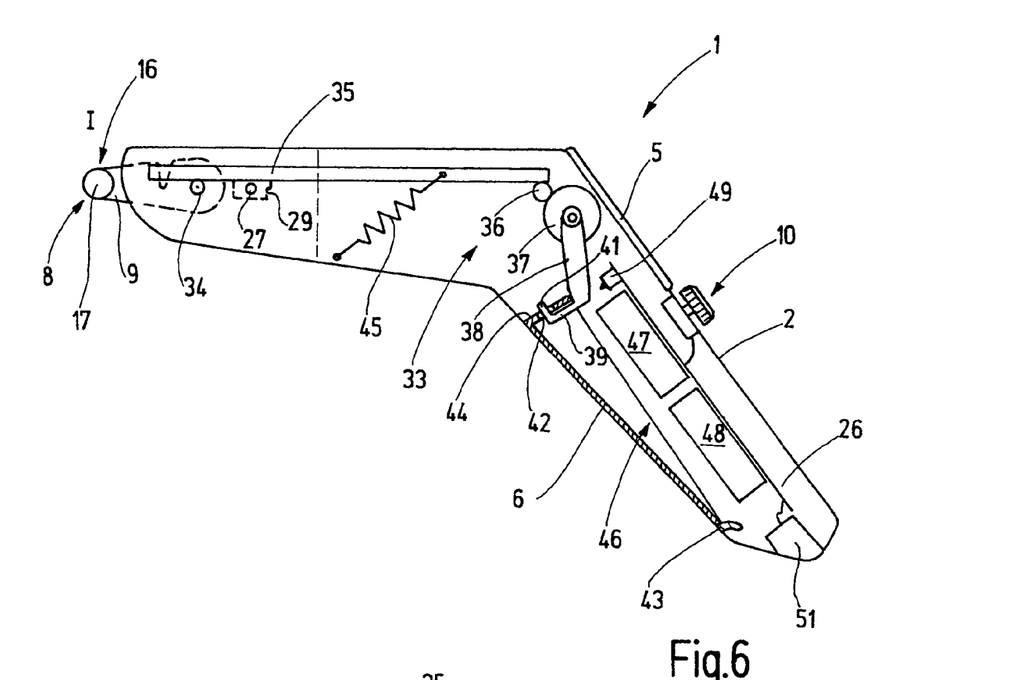
FIG. 6 is a longitudinal section of the illustrated yarn measuring device showing an actuating member of the device in an unactuated position.
Figure 7:
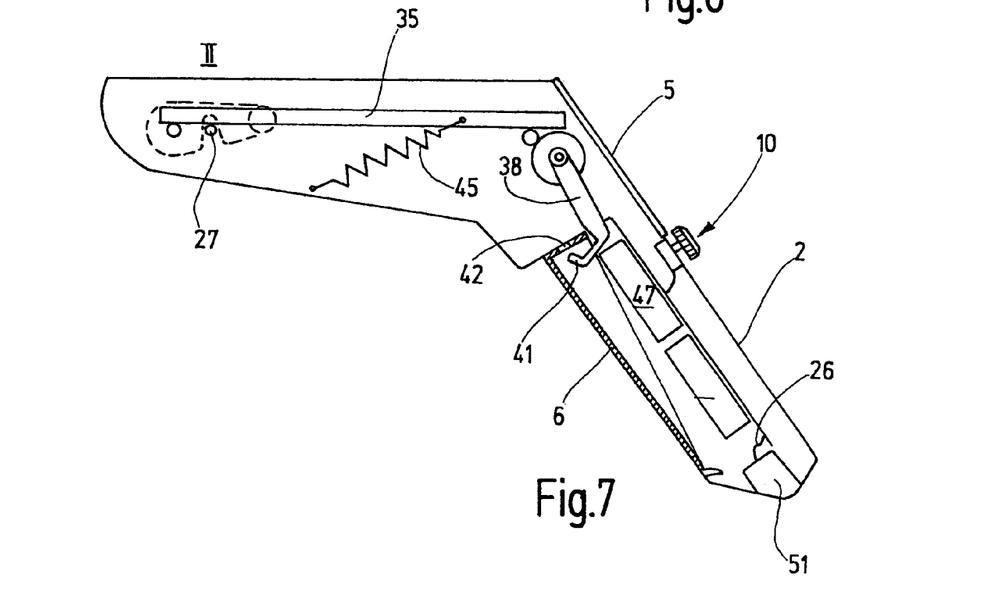
FIG. 7 is a longitudinal section, similar to FIG. 6, showing the actuating member device in an actuated position.

A yarn guide element 23 in the form of a rotatably supported yarn spool 24 is disposed concentrically to the pivot axis 18, or in the immediate vicinity thereof, and like the yarn spool 17, it has a yarn groove. The yarn grooves of the yarn spools 17, 24, as shown in FIG. 3, are disposed in a common plane E, to which the pivot axis 19 and the axis of rotation 18 are perpendicular. The yarn spool 24 in this instance is connected to a rotation transducer 25. The rotation transducer, which may be of known type, outputs electrical signals in accordance with the rotation of the yarn spool 27. The rotation transducer 25 is connected to an appropriate processing device such as a microcomputer, having, for example, a printed circuit board 26, as depicted in FIGS. 6 and 7. The processing device 26 is connected with the display 5, which can be used for equipment setup, operation, and display of measured values.

As shown in FIG. 5, between the yarn guide element 23 and the yarn guide element 16 when in the measuring position, there is a yarn applicator element 27 in the form of a pin 28 that extends approximately parallel to the pivot axis 19 (FIG. 3). A free end 7 the pin 28 protrudes into the passage 11, and on the other end of the pin 28 is connected to a force sensor 29. The force sensor 29 and the pin 28 form a yarn tension meter 31. This yarn tension meter is connected to the processing device and sends electrical signals to it that correspond to the yarn tension detected. As shown in FIG. 5, the pin 28 is disposed above a tangent that connects the yarn spool 24 with the yarn spool 17 so that the yarn 21 traveling through travels over the pin 28 at an obtuse angle. The precise size of this angle is defined by the position of the stop peg 22. The lever 9 is formed with a funnel-shaped cutout 32, which when the lever 9 is pivoted into the measuring position is located above the pin 28 without touching it.

Pivotable movement of the lever 9 is effected by actuation of the trip lever 6, which in this sense forms an actuating member. An associated actuating mechanism 33 connects the trip lever 6 to the lever 9, as depicted in FIGS. 6 and 7. The illustrated actuating mechanism 33 includes a gear wheel 34, which is connected to the lever 9 in a manner fixed against relative rotation and meshes with a rack 35 that is supported axially displaceably in the housing 2. The other end the rack 35 meshes with a gear wheel 36 that is rotatably supported in the housing 2. The gear wheel 36 meshes with a rotatably supported gear wheel 37, which has a lever 38 fixedly secured thereto. This lever 38 has a hook-shaped end 39 which in a deactivated position, has a luglike extension 41 that engages an opening 42 of the lever 6. The trip lever, which is constructed in shell form, has a peg or similar protrusion extending laterally away from one end for pivotable support in a sliding-block guide 43. The opening 42 is oriented approximately radially to the pivot axis thus defined by the sliding-block guide 43, which axis is approximately perpendicular to the plane of FIG. 6. The lever 38 is disposed such that the protrusion 41 moves out of the opening 42 when the lever 6 is pressed into the housing 2. During such movement, a front wall 44 presses against the lever 38, even if the protrusion 41 has moved out of the opening 42. In such position, the trip lever 6 preferably forms an obtuse angle with the lever 38. A tension spring 45 in this case pre-stresses the rack 35 in a selected longitudinal direction such that the lever 9 is biased toward its tuck position I.

The trip lever 6 preferably may form a battery compartment lid. In the illustrated embodiment it spans a battery compartment 46 located beneath it, in which one or more batteries 47, 48 are disposed for supplying power to the processing device. The batteries can be supported by the printed circuit board 26. The printed circuit board has an additional switch that activates the processing device. The actuating mechanism 33 in this case has a certain amount of play or elasticity, which makes further depression of the trip lever 6 possible for activating the switch 49, once the lever 9 has reached its measuring position II.

Figure 9:
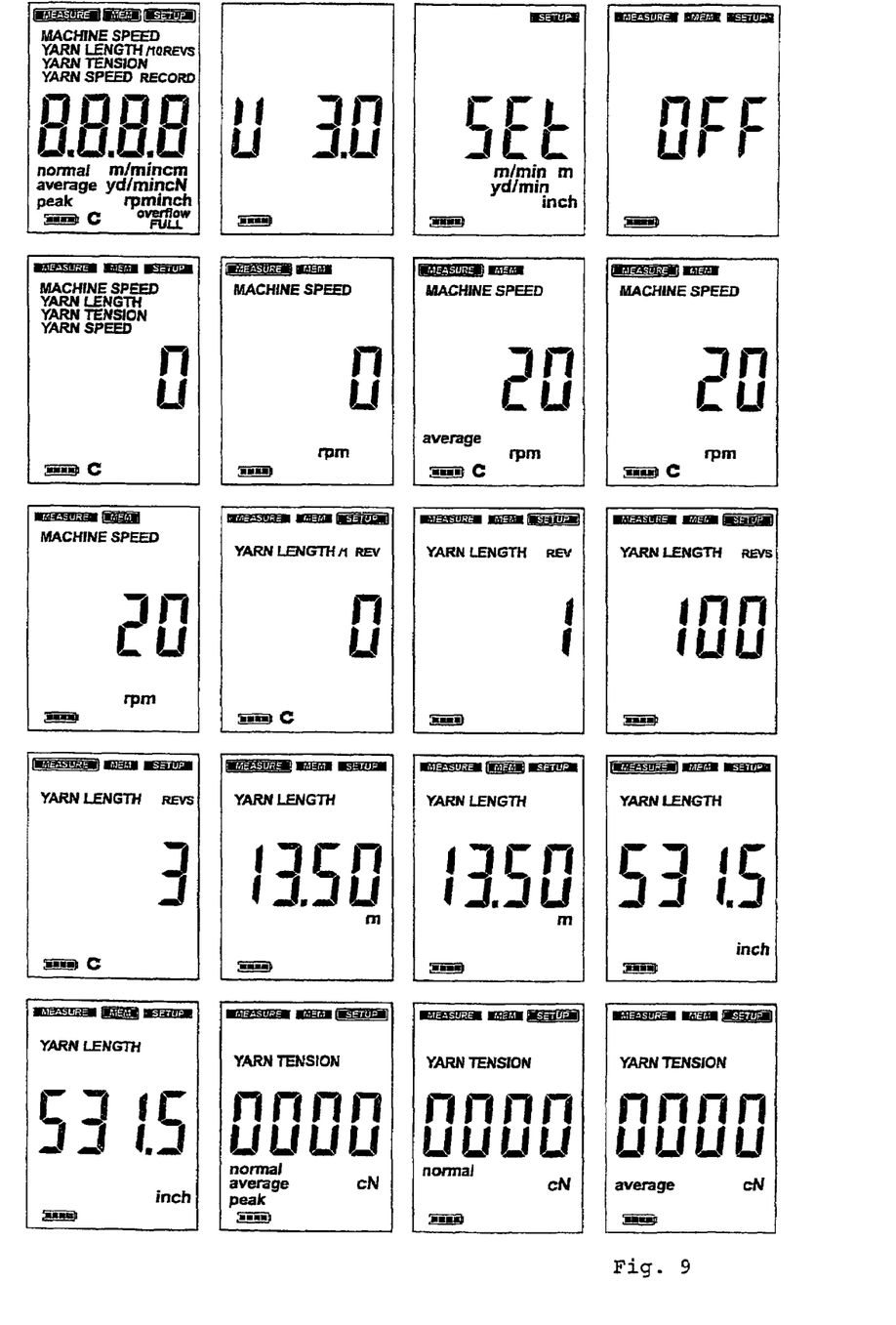
FIGS. 9-11 illustrate various displays that appear on the yarn measuring device during usage.

The yarn measuring device 1 described thus far functions as follows:

The yarn measuring device 1 is switched on when pressure is exerted on the control knob 10 as will be understood by a person skilled in the art. Alternatively or in addition, the yarn measuring device 1 be switched on by actuation of the trip lever 6. The yarn measuring device is automatically switched off once a waiting period has elapsed without further actuation, or alternatively by holding the control knob down longer. The display 5 is shown in FIG. 9 at the top left with all the display options. By twisting and/or pressing on the control knob 10 (depending on the embodiment), the three fundamental operating modes of measurement (MEASURE), storage and memory (MEM) and setup (SETUP) can be selected. The menu used for the measurement is shown in FIG. 9 in the left-hand column, line 2. If it is activated, the measurement of the rotary machine speed, yarn length, yarn tension, and yarn speed can be selected. Line 2 in FIG. 9 illustrates various displays, for instance for average rpm or current rpm (third and fourth columns). The first line, conversely, shows various setups (SETUP), for instance for the unit selected (m/min, m, yd/min, or inch).

Figure 10:
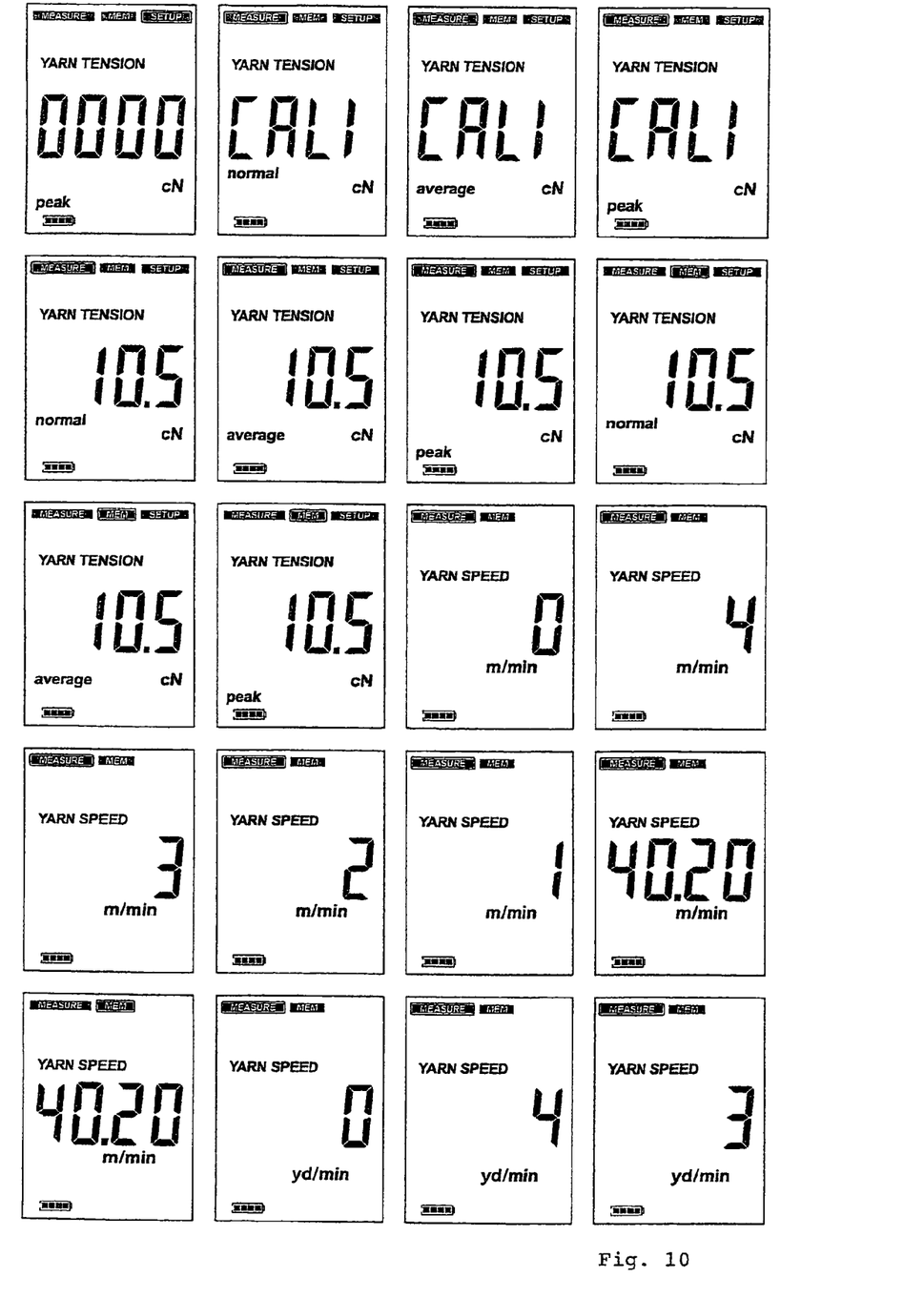
Figure 11:
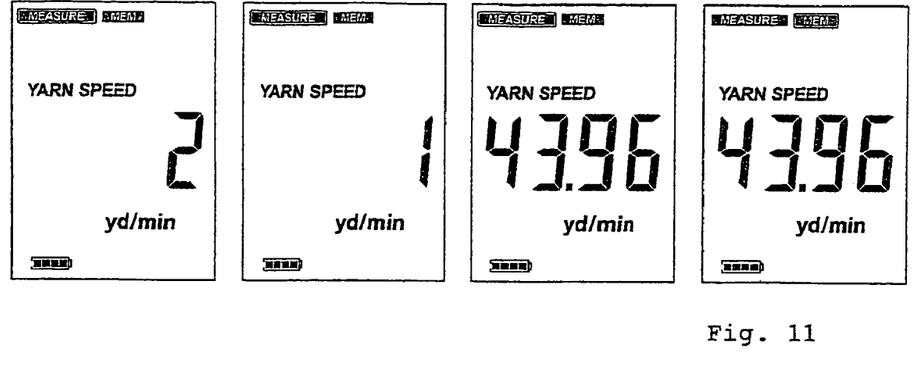

Similarly, the measurement of the yarn length can be selected in various operating modes (FIG. 9, third line, second column, through fifth line, first column). The menus and displays on the display 5 for the yarn tension can be seen in FIG. 9, fifth line, second column, through FIG. 10, third line, second column. The other displays pertain to the yarn speed.

Once the desired measurement mode has been selected, the yarn measuring device is brought to the yarn, as shown in FIG. 4, until the yarn spool 17 engages the yarn 21 from behind. If the trip lever 6 is now actuated, the lever 9 pivots out of its tuck position I into its measuring position II, as shown in FIG. 5. In the process, the lever 9 presses against the stop peg 22 and thus assumes a defined position. In that position, the yarn 21 travels over the pin 28, and a force corresponding to the yarn tension is recorded at the force sensor 29. This force is converted by the processing device into a yarn tension value and shown on the display 5; see FIG. 9 or 10. Depending on the selection chosen, the average tension, peak tension, rated tension, deviation from the rated tension, or the like can be displayed.

The actual measurement is activated when the control lever 6 is pressed firmly into the housing 2, once the lever 9 has reached its measuring position II. The control lever 6 then actuates the switch 49 for performing the measurement. In its previous position, in which the lever 9 has already reached the stop peg 22 but the switch 49 is not yet actuated, the control lever 6 can be stopped if needed by means of an appropriate slide or the like.

The printed circuit board 26, or the processing device disposed on it, can be provided, as shown FIGS. 6 and 7, with an interface 51 in the form of a plug socket, provided on the lower end of the housing 2, or in the form of a wireless radio path. The interface 51 serves to carry signals (data) in and out. Such signals or data can represent the machine speed of a knitting machine connected to it or similar external data that are taken into account by the processing device. This makes it possible for instance to display the machine speed, as shown in FIG. 9, column 2, line 2 through column 1, line 3. Also, because external data are made available, it becomes possible to calculate and display pertinent variables, such as the yarn length per machine revolution (FIG. 9, column 2, line 3). Also via the interface 51, data can be sent onward as needed to some external device. This can be of value particularly when many yarns in succession must be scanned and monitored with the yarn measuring device 1.

Figure 8:
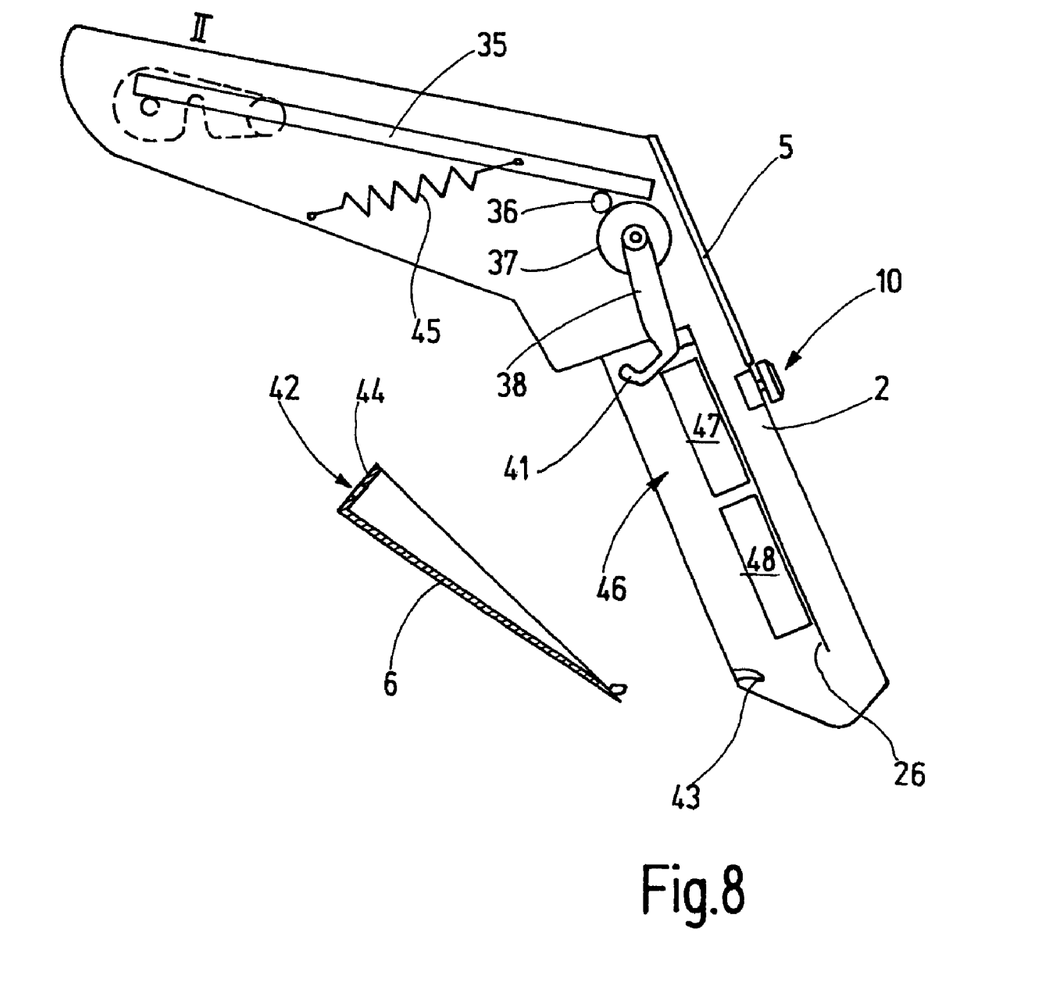
FIG. 8 is a schematic longitudinal section of the illustrated yarn measuring device showing a battery compartment lid removed from the handle of the device.

Changing the batteries 47, 48 is effected as follows:

If the battery compartment 46 is to be opened, the trip lever 6 is pressed into the housing 2. In the process, the protrusion 41 moves out of the opening 42 so that there is no longer any locking or other positive engagement between the trip lever 6 and the lever 38. The trip lever 6 that forms the battery compartment lid cannot fall off, however, because it is firmly held by the fingers of the user, who must hold the trip lever 6 against the force of the tension spring 45. For removing the battery compartment lid, the lever 9 is now held, for instance, by hand in its measuring position, while the trip lever 6 is released. Because the lever 38 stays in its deflected position, visible in FIG. 7, the lid can now be freely removed. This can be seen from FIG. 8.

The battery compartment lid is installed in reverse order. The lever 9 is shifted to the measuring position II, after which the trip lever 6 can be inserted into the opening in the battery compartment. If the lever 9 is released, the lever 38 catches on the trip lever 6 and in turn keeps the trip lever in place.

From the foregoing, it can be seen that the yarn measuring device 1 of the invention is a hand-operated measuring instrument, with a yarn catcher 8 which, when a trip lever 6 is tripped, places the yarn over a yarn applicator element 27 of a force sensor 29. The yarn tension detected, like the yarn speed detected, is delivered to a processing device for display and further processing. The device makes one-handed operation possible. The boomerang-shaped housing 2 is embodied on one end as a handle, on which a trip lever, a control knob 10 in the form of a knob/pushbutton, and a display 5 are all disposed. The control knob 10 can be twisted and depressed by the user's thumb so that full operation, that is, the selection of all the measurement and operating modes, can be done with only the thumb. The measurement is performed by means of the trip lever 6, which actuates both the yarn catcher 8 and a measurement activation switch 49.

The invention claimed is:

1. A hand held yarn measuring device comprising:
 a housing (2) having a handle (4) with an actuating member (6),
 a yarn catcher (8) supported by the housing (2) for movement between a first tuck position (I) and a second measuring position (II),
 an actuating mechanism (33) connecting said actuating member (6) to said yarn catcher (8),
 a yarn guide element (23) disposed at a location between said two yarn catcher positions (I, II),
 a yarn tension indicator (31) disposed at a point between the yarn catcher measuring position (II) and the yarn guide element (23), and
 said yarn tension indicator (31) including a yarn applicator element (27) and a force sensor (29) connected to the yarn applicator element (27).

2. The yarn measure device of claim 1 in which said yarn catcher (8) includes a pivotably supported lever (9) having a yarn guide element (16) at a free end of said lever (9).

3. The yarn measure device of claim 2 in which said yarn guide element (23) is a rotatably supported yarn spool (17).

4. The yarn measure device of claim 1 including a stop member (22) for defining the yarn catcher measuring position (II).

5. The yarn measure device of claim 1 in which said yarn guide element (23) is a rotatably supported yarn spool (24), and said yarn spool (24) is connected to a sensor (25).

6. The yarn measure device of claim 5 in which said sensor (25) is a rotary position sensor.

7. The yarn measure device of claim 5 in which said sensor (25) is an rpm sensor.

8. The yarn measure device of claim 1 in which said yarn applicator element (27) is a pin extending parallel to a pivot axis (19) of the lever and supported by said force sensor (29).

9. The yarn measuring device of claim 1 in which said yarn tension indicator (31) is connected to a processing device.

10. The yarn measuring device of claim 9 in which said processing device is connected to a display device.

11. The yarn measuring device of claim 1 in which said housing (2) has two elongated legs (3, 4) that form an obtuse angle with one another.

12. The yarn measuring device of claim 11 in which said yarn catcher (8) is supported by a free end of one of said legs (3, 4) and the other leg (4) serves as said handle.

13. The yarn measuring device of claim 1 including battery compartments (46) for at least one supply battery (47, 48) disposed in said handle.

14. The yarn measuring device of claim 13 in which said actuating member (6) forms a closure lid for said battery compartment (46).

15. The yarn measuring device of claim 14 in which said actuating member (6) is moveable between an actuating position and an unactuated position, and said actuating mechanism (33) positively engages and secures said actuating member (6) when in said unactuated position.

16. A hand held yarn measuring device comprising:
a housing (2) having a handle (4) with a selectively actuatable actuating member (6),
a yarn catcher (8) supported by said housing (2) for movement between a first position that permits contact with moving yarn and a second measuring position,
an actuating mechanism (33) connecting said actuating member (6) to said yarn catcher (8),
a first yarn guide indicator for measuring the speed of said moving yarn,
a second yarn indicator for measuring the tension of the moving yarn,
said yarn catcher being moveable from said first position to said second position in response to actuation of said actuating member (6) for causing said moving yarn to simultaneously engage said first and second indicators,
said yarn tension indicator (31) being connected to a processing device, and
said processing device being connected to a display device on said housing and a control switch having a control knob (10) disposed on said handle (4).

17. A hand held yarn measuring device comprising:
a housing (2) having a handle (4) with an actuating member (6),
a yarn catcher (8) supported by the housing (2) for movement between a first tuck position (I) and a second measuring position (II),
an actuating mechanism (33) connecting said actuating member (6) to said yarn catcher (8),
a yarn guide element (23) disposed at a location between said two yarn catcher positions (I, II),
a yarn tension indicator (31) disposed at a point between the yarn catcher measuring position (II) and the yarn guide element (23),
a processing device connected to said yarn tension indicator (31), and
said processing device being connected to at least one of a control switch having a control knob (10) disposed on said handle (4), a control switch having a push button actuator disposed on said handle (4), a menu oriented input for setting various operating modes on a display device, an interface (51) for receiving signals external to the yarn measuring device, or an interface (51) for outputting signals to an external device.

18. A hand held yarn measuring device comprising:
a housing (2) having a handle (4) with an actuating member (6),
a yarn catcher (8) supported by the housing (2) for movement between a first tuck position (I) and a second measuring position (II),
an actuating mechanism (33) connecting said actuating member (6) to said yarn catcher (8),
a yarn guide element (23) disposed at a location between said two yarn catcher positions (I, II),
a yarn tension indicator (31) disposed at a point between the yarn catcher measuring position (II) and the yarn guide element (23),
said handle (4) having a battery compartment (46) for at least one supply battery (47, 48) disposed therein,
said actuating member (6) being moveable between an actuating position and an unactuated position,
said actuating mechanism (33) positively engaging and securing said actuating member (6) when in said unactuated position, and
said actuating mechanism having a locking bar (41) that positively engages said actuating member (6) when in said unactuated position.

19. The yarn measure device of claim 18 in which said locking bar (41) is moved transversely to and disengages from the actuating member (6) in response to movement of said actuating member (6) from said unactuated position to said actuated position.

20. A hand held yarn measuring device comprising:
a housing (2) having a handle (4) with an actuating member (6),
a yarn catcher (8) including a pivotably supported lever (9) having a yarn guide element (16) at a free end of said lever (9), said yarn catcher lever (9) being supported by the housing (2) for movement between a first tuck position (I) and a second measuring position (II),
an actuating mechanism (33) connecting said actuating member (6) to said yarn catcher (8),
a yarn guide element (23) including a rotatably supported yarn spool (24) disposed at a location between said two yarn catcher positions (I, II),
said yarn spool (24) being connected to a rotary encoder (25) for enabling measurement of yarn speed,
a thread tension meter (31) arranged at a location between the measuring position (II) and the thread guide element (23),
said measuring position (II) of the thread catcher (8) being defined by a stop element (22), and
a processing device (26) connected to the thread tension meter (31) and a display device (5).

* * * * *